United States Patent
Debban et al.

(10) Patent No.: US 9,031,369 B2
(45) Date of Patent: May 12, 2015

(54) LIQUID AND GASEOUS RESISTANCE COMPACT FIBER UNIT AND METHOD OF MAKING THE SAME

(71) Applicant: OFS Fitel, LLC, Norcross, GA (US)

(72) Inventors: Harold P Debban, Snellville, GA (US); Timothy Goddard, Newnan, GA (US); Heng Ly, Stone Mountain, GA (US); Peter A Weimann, Atlanta, GA (US)

(73) Assignee: OFS Fitel, LLC, Norcross, GA (US)

( * ) Notice: Subject to any disclaimer, the term of this patent is extended or adjusted under 35 U.S.C. 154(b) by 134 days.

(21) Appl. No.: 13/827,835

(22) Filed: Mar. 14, 2013

(65) Prior Publication Data

US 2014/0064682 A1 Mar. 6, 2014

Related U.S. Application Data

(60) Provisional application No. 61/696,437, filed on Sep. 4, 2012.

(51) Int. Cl.
G02B 6/44 (2006.01)

(52) U.S. Cl.
CPC ............ *G02B 6/4429* (2013.01); *G02B 6/4483* (2013.01)

(58) Field of Classification Search
USPC ......................................................... 385/102
See application file for complete search history.

(56) References Cited

U.S. PATENT DOCUMENTS

| | | | |
|---|---|---|---|
| 4,976,519 A * | 12/1990 | Davey et al. .................. | 385/102 |
| 7,720,338 B2 | 5/2010 | Graveston et al. | |
| 7,899,291 B2 | 3/2011 | Bardroff et al. | |
| 8,380,030 B2 * | 2/2013 | Ruzzier et al. ................ | 385/111 |
| 2006/0088257 A1 * | 4/2006 | Maeda et al. ................. | 385/102 |
| 2007/0063363 A1 * | 3/2007 | Sutehall et al. .............. | 264/1.24 |
| 2009/0059966 A1 * | 3/2009 | Mayer et al. ...................... | 372/6 |
| 2011/0243515 A1 | 10/2011 | Bradley et al. | |
| 2012/0155814 A1 * | 6/2012 | Leonard et al. ............... | 385/106 |
| 2012/0177330 A1 * | 7/2012 | Keller .......................... | 385/102 |

* cited by examiner

*Primary Examiner* — Jerry Blevins

(57) ABSTRACT

The embodiments disclosed herein seek to eliminate substantially all of the voids or air gaps among neighboring fibers within a CFU by wetting a plurality of optical fibers that comprises the CFU with an acrylate prepolymer resin before the plurality of the optical fibers are grouped together tightly. In one embodiment, instead of extruding a first acrylate prepolymer resin to the optical fibers immediately after a first die, the disclosed process wets the optical fibers with a first acrylate prepolymer resin prior to the first die.

20 Claims, 3 Drawing Sheets

LIQUID AND GASEOUS RESISTANCE COMPACT FIBER UNIT AND METHOD OF MAKING THE SAME

CROSS REFERENCE TO RELATED APPLICATIONS

The present application claims the priority benefit of U.S. Provisional Patent Application Ser. No. 61/696,437, entitled "Liquid and Gaseous Resistance Compact Fiber Unit," filed on Sep. 4, 2012, which is owned by the assignee of the present application, and which is incorporated herein by reference in its entirety.

FIELD OF THE DISCLOSURE

The present disclosure relates generally to optical fibers and, more particularly, to compact fiber units.

DESCRIPTION OF RELATED ART

A compact fiber unit (CFU) is multiple optical fibers encapsulated in a round matrix of thermoset polymer, with one or more layers and optional glass beads. CFUs are versatile and cost effective in short distance applications that require high fiber packing density. However, all of the existing CFUs have a flaw that allows liquid and gas to penetrate through the CFUs longitudinally. Because a pultrusion process is used to manufacture the CFUs, the current manufacturing process leaves one or more voids or air gaps in one or more closed spaces among neighboring fibers. Those voids or air gaps allow liquid and gas to penetrate through the CFUs. This is undesirable because water or gas inside the CFUs could cause component and/or signal transmission failure, and have detrimental effects upon the lifetime of the product.

BRIEF SUMMARY OF THE INVENTION

Disclosed herein are various embodiments of compact fiber units (CFU), systems and processes that eliminate one or more voids or air gaps among neighboring fibers within the CFU to prevent liquid and gas to penetrate through. In some embodiments, the one or more voids or air gaps are filled with an acrylate resin.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
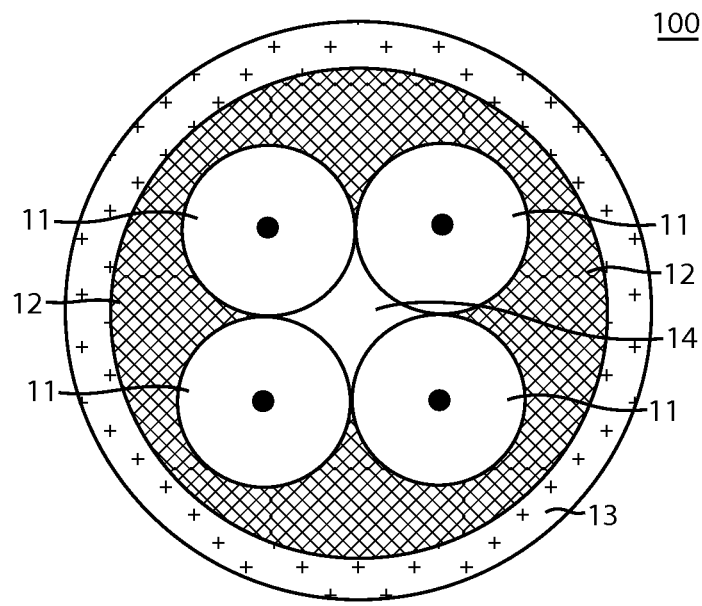
FIG. 1 shows a cross sectional area of a compact fiber unit (CFU) with a void in an interior space, in accordance with the prior art.

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand requires cost effective short distance embodiments of fiber optic cables.

A compact fiber unit (CFU) is one of the solutions to provide a cost effective short distance application of the fiber optic cables. The CFU is a bundle of a plurality of optical fibers (generally two to twelve fibers) encapsulated with at least one layer of an acrylate resin. Typical size of the CFU is approximately 0.8 to 1.5 mm in the diameter. The CFU is versatile and cost effective in short distance applications that require high fiber packing density. One application of the CFU is to use it as a sub-unit of an indoor cable because CFU has superior crush performance comparing with a comparative indoor cable with loose 250 micron fibers. Another application of the CFU is to use it as an optical fiber package for an air-blown installation application. In the air-blown installation application, the outer surface of CFU is usually modified to reduce friction between the CFU and a conduit or a gas pipeline during the installation.

However, all of the existing CFUs have a flaw that allows liquid and gas to penetrate through the CFU longitudinally. Because a pultrusion process is used to manufacture the CFUs, the current manufacturing process leaves one or more voids or air gaps in the closed spaces among neighboring fibers. Those voids or air gaps allow liquid and gas to penetrate through the CFU. This is undesirable because water or gas inside the CFUs could cause components and/or signal transmission failure, and have detrimental effects upon lifetime of the product. Liquid water is known to degrade the mechanical strength of optical fibers, so blocking a pathway where liquid water may collect or be transported may improve product lifetime. Units installed in conduits which are not blocked against gas penetration may allow transport of undesirable gases, such as sewer gas or natural gas from leaks, into end-user premises. In the current art, special equipment and procedures are used to seal off the inside of a CFU at entry and exit points from conduits or customer premises.

The embodiments disclosed herein seek to eliminate substantially all of the voids or air gaps among neighboring fibers within a CFU by wetting a plurality of optical fibers that comprises the CFU with an acrylate prepolymer resin before the plurality of the optical fibers are grouped together tightly. In one embodiment, instead of applying a first acrylate prepolymer resin to the optical fibers immediately after a first die, the disclosed process wets the optical fibers with a first acrylate prepolymer resin prior to the first die. Stated differently, the first prepolymer acrylate resin wet the optical fibers before the first die groups the optical fibers together. In one preferred embodiment, the first acrylate prepolymer resin that is applied to the optical fibers prior to the first die and the second acrylate prepolymer resin that is applied immediately after the first die share approximately the same optical and mechanical properties. After the second acrylate prepolymer resin is applied, the resins are cured through application of heat or radiation.

A pultrusion process is a preferred process to manufacture optical fiber cables and CFUs because of the production efficiency and cost effectiveness of the process in mass production. However, in a conventional CFU manufacturing using the pultrusion process, because a first acrylate prepolymer resin is applied to the optical fibers after the optical fibers are grouped together tightly (usually to minimize the closed interior spaces for a given fiber counts), any closed interior spaces that are created among neighboring fibers are not filled with the acrylate resin. Any voids or air gaps within the closed interior spaces allow liquid and gas to penetrate through the CFU. The liquid or gas inside the CFU could cause components and/or signal transmission failure, and have detrimental effects upon lifetime of the product.

By wetting the optical fibers with an acrylate prepolymer resin prior to the creation of any closed interior spaces, there are sufficient amount of the acrylate resin to fill in the voids or air gaps that would be present within the closed interior spaces in a conventional CFU manufacturing process using the pultrusion process. Thus, the disclosed inventive pultrusion process results in more robust CFUs that prevent penetration of liquid or gas inside the CFUs.

As described in greater detail herein, wetting the optical fibers with a thermoset prepolymer acrylate resin prior to the creation of any closed interior spaces eliminates substantially all of the voids or air gaps within the closed interior spaces. Having provided an overview of several embodiments, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 shows a cross sectional area of a compact fiber unit (CFU) 100 with a void 14 in a closed interior space, in accordance with the prior art. As shown in FIG. 1, the CFU 100 has four optical fibers 11 encased and embedded in a soft acrylate resin 12. The soft acrylate resin 12 is further surrounded and encased with a relatively hard acrylate resin 13, and both resins are cured to form the final CFU product. The soft acrylate resin 12 and the hard acrylate resin 13 together create a dual-layer acrylate construction to minimize transfer of bending and crushing force to the optical fibers 11 inside of the CFU 100. Such dual-layer acrylate construction protects the optical fibers 11 from excessive bending and other external forces and minimizes signal attenuation of the optical fibers 11 inside the CFU 100.

However, because CFU 100 is typically made by a conventional pultrusion process in mass production, the current manufacturing process leaves a void 14 in a closed interior space. The closed interior space is a space created by three or more neighboring fibers that the liquid prepolymer acrylate resin does not reach prior to curing in the conventional pultrusion process. The void 14 in the closed interior space allows liquid and gas to penetrate through the CFU 100. The water or gas inside the CFU 100 could cause components and transmission failure, and have detrimental effect upon lifetime of the final product.

Figure 2:
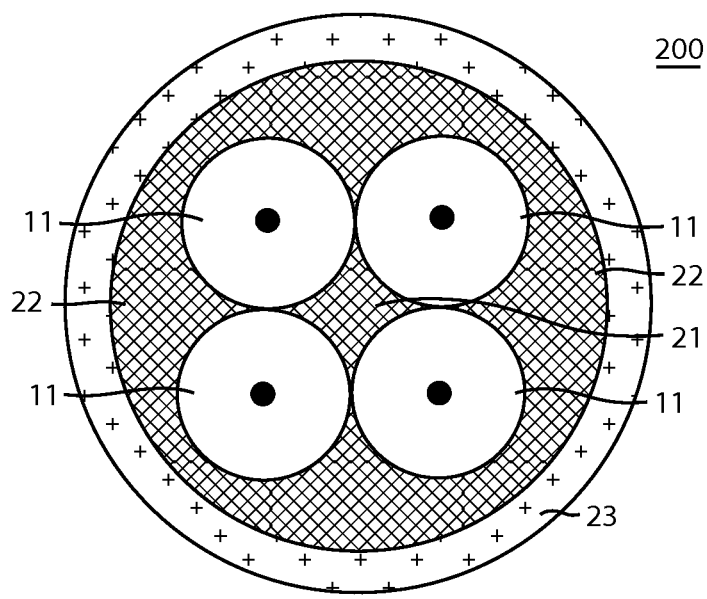
FIG. 2 shows a cross sectional area of a CFU that the interior space is filled with an acrylate resin, in accordance with the present invention.

FIG. 2 shows a cross sectional area of a CFU 200 that the interior space is filled with a first acrylate resin 21, in accordance with the present invention. As shown in FIG. 2, the CFU 200 has four optical fibers 11 encased and embedded in a second acrylate resin 22 and further surrounded and encased with an extruded third acrylate resin 23. However, unlike the conventional CFU 100 shown in FIG. 1, the closed interior space of the CFU 200 according to an embodiment of the present invention is filled with the first acrylate resin 21.

By filling in the closed interior space with the first acrylate prepolymer resin 21 prior to curing, the CFU 200 prevents liquid and gas to penetrate through the CFU 200. Therefore, water or gas that could cause components and transmission failure if present inside the system is eliminated from the CFU 200, and the inventive CFU 200 provides robustness and extended lifetime of the final product.

While the dual-layer acrylate construction is shown to illustrate one embodiment of CFUs, it should be appreciated that number of layers may be modified based on the applications and preferences. For example, the CFU may be a single-layer acrylate construction or multi-layer acrylate construction.

Furthermore, the inventive CFU 200 in FIG. 2 contains four optical fibers 11, but may contain any combinations of optical fibers and fillers between three and twenty four. In commercial practice, CFUs with any combinations of optical fibers and fillers between four and twelve may be expected to be the most common. The fillers are sometime referred as dummy fibers. In addition, the individual optical fibers 11 may be color coded to aid in identifying and organizing the optical fibers for ribbonizing or splicing.

In some embodiments, preferably, optical and mechanical properties of the first acrylate resin 21 and the second acrylate resin 22 are the same. The similarities in those properties between the first and second acrylate resins 21, 22 provide uniformity of mechanical and optical characteristics of the CFU 200. Most preferably, the first and second acrylate resins 21, 22 are the same material. However, the first and second acrylate resins 21, 22 may be different material to further optimize optical, mechanical or other property of the CFU 200.

Furthermore, in the dual-layer acrylate construction as shown in FIG. 2, preferably, the second acrylate resin 22 is softer than the third acrylate resin 23 such that the optical fibers 11 are protected from excessive bending and other external forces to minimize signal attenuation of the optical fibers 11 inside the CFU 200.

The second acrylate resin 22 and the third acrylate resin 23 can be characterized in various ways. For example, using the American Society for Testing and Materials (ASTM) D882 standard measurement method, the preferable tensile modulus for the second acrylate resin 22 is in the range 0.1 to 50 MPa, and most preferably 0.5 to 10 MPa. Preferred range for the third acrylate resin 23 is 100 MPa to 2000 MPa, and most preferably 200 MPa to 1000 MPa.

The second and third acrylate resins 22 and 23 may also be characterized using glass transition temperatures ($T_g$). It is preferred that the $T_g$ of the second acrylate resin 22 be less than 20 degrees C., and the $T_g$ of the third acrylate resin 23 be greater than 40 degrees C. For the purpose of this description, the $T_g$ is the peak of the tan delta curve in a DMA (dynamic mechanical analysis) plot.

Although the dual-layer construction is a preferred structure of the CFU 200, the present invention works equally well for a single layer construction or other multi-layer constructions of the CFU.

One way of manufacturing the CFU 200 is by using a pultrusion process. It is the preferred way to mass-produce the CFU 200 because of the production efficiency and cost effectiveness of the process.

Figure 3:
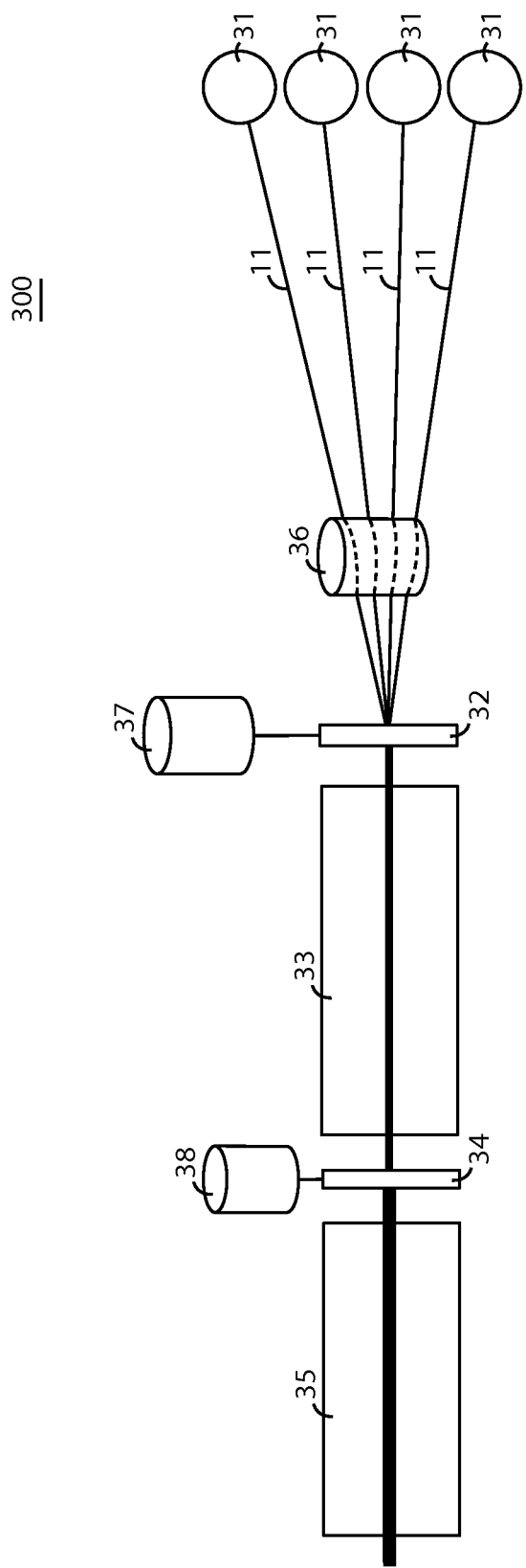
FIG. 3 shows one method to manufacture the CFU of FIG. 2, in accordance with the present invention.

FIG. 3 shows one method to manufacture the inventive CFU 200 in FIG. 2, in accordance with the present invention. First, a plurality of the optical fibers 11 is paid out from individual spools 31. Before the optical fibers 11 are guided into a first die 32, the optical fibers 11 are wetted with the first acrylate prepolymer resin 36. Then, the optical fibers 11 are grouped together tightly by the first die 32. Wetting the optical fibers 11 with the first acrylate prepolymer resin 36 before the first die 32 allows the first acrylate prepolymer resin 36 to fill in the closed interior space that would be created when the optical fibers 11 are grouped together tightly. Preferably, tight grouping of the optical fibers 11 provides a cross sectional packing structure that minimizes the closed interior spaces for a given fiber counts. Although the first die 32 groups the optical fibers 11 together in FIG. 3, the optical fibers 11 can be grouped together by other means. For example, the optical fibers 11 may be twisted together to group them tightly.

Viscosity of the first acrylate prepolymer resin 36 is sufficiently high for the optical fibers 11 to hold sufficient amount of the first acrylate prepolymer resin 36 to fill in the substantial space of the closed interior space of the later formed CFU 200. Preferably, the viscosity of the first acrylate prepolymer resin is at least 1000 mPas-sec at 25° C. Most preferably, the viscosity of the first resin is at least 1800 mPas-sec at 25° C.

The CFU manufacturing system 300 in FIG. 3 takes up four optical fibers 11, but may contain any combinations of optical fibers and fillers between three and twenty four. In commercial practice, CFUs with any combinations of optical fibers and fillers between four and twelve may be expected to be the most common. In addition, the individual optical fibers 11 may be color coded to aid in identifying and organizing the optical fibers for ribbonizing or splicing.

Immediately after the first die 32, the second acrylate prepolymer resin 37 is applied onto the optical fibers 11, and both first and second acrylate prepolymer resins 36 and 37 are cured by the first UV light from a first UV curing oven or lamp 33 to form first and second acrylate resins 21 and 22. Then, immediately after a second die 34, the third acrylate prepolymer resin 38 is applied on top of the cured second acrylate resin 22, and the third acrylate prepolymer resin is cured by the second UV light from a second UV curing oven or lamp 35 to form the third acrylate resin 23.

Although the CFU manufacturing system 300 in FIG. 3 includes the third acrylate prepolymer resin 38, the second die 34, and the second UV curing oven or lamp 35, such subsystem is optional. As described before, the optical fibers 11 may only be encapsulated with one layer of an acrylate resin to form the CFU.

Furthermore, if more than one layer of an acrylate prepolymer resin is applied onto the optical fibers, each layer may be cured immediately after the layer is applied, or multiple layers can be cured by a single or series of UV lights at once. For example, the third acrylate prepolymer resin 38 may be applied on top of the uncured second acrylate prepolymer resin 37 that encapsulates the optical fibers 11. At the time, because the second acrylate prepolymer resin 37 is uncured, the first acrylate prepolymer resin 36 is also uncured. Then, all of the acrylate prepolymer resins are cured by the second UV light from the second UV curing oven or lamp 35. Alternatively, the third acrylate prepolymer resin 38 may be applied on top of the cured second acrylate resin 22, then the third acrylate prepolymer resin 38 is cured by the second UV light.

Figure 4:
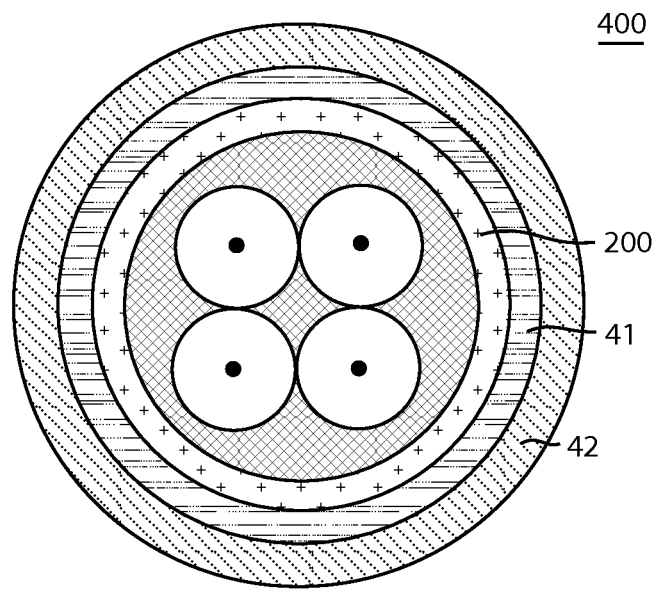
FIG. 4 shows an optical cable that includes the CFU of FIG. 2, in accordance with the present invention.

After the CFU 200 is manufactured, the CFU 200 may be further processed and used as a sub-unit of an optical fiber cable 400 as shown in FIG. 4. The optical fiber cable 400 has the inventive CFU 200, yarn 41 that surrounds the CFU 200, and a jacket 42 that surrounds the yarn 41.

The yarn 41 wraps around the CFU 200 for reinforcement. The yarn 41 is preferably polyaramid. The yarn 41 may be run straight or may be helically twisted. For indoor-outdoor applications, the yarn 41 may be coated with a waterswellable finish that can prevent water penetration down the length of the cable 400. Other waterblocking provisions, such as tapes or powders, may also be used to limit water penetration.

The jacket 42 is formed around the CFU 200 and the yarn 41. The jacket 41 is preferably made from flame-retardant polymer. Suitable jacket polymers are PVC, low-smoke PVC, PVDF, FEP, PTFE, compounded fluoropolymer blends, low-smoke zero halogen polyolefin-based resins, flame retardant thermoplastic elastomers, and flame retardant nylons. The jacket polymer may contain UV stabilizers to allow use of the cable for indoor-outdoor applications.

Figure 5:
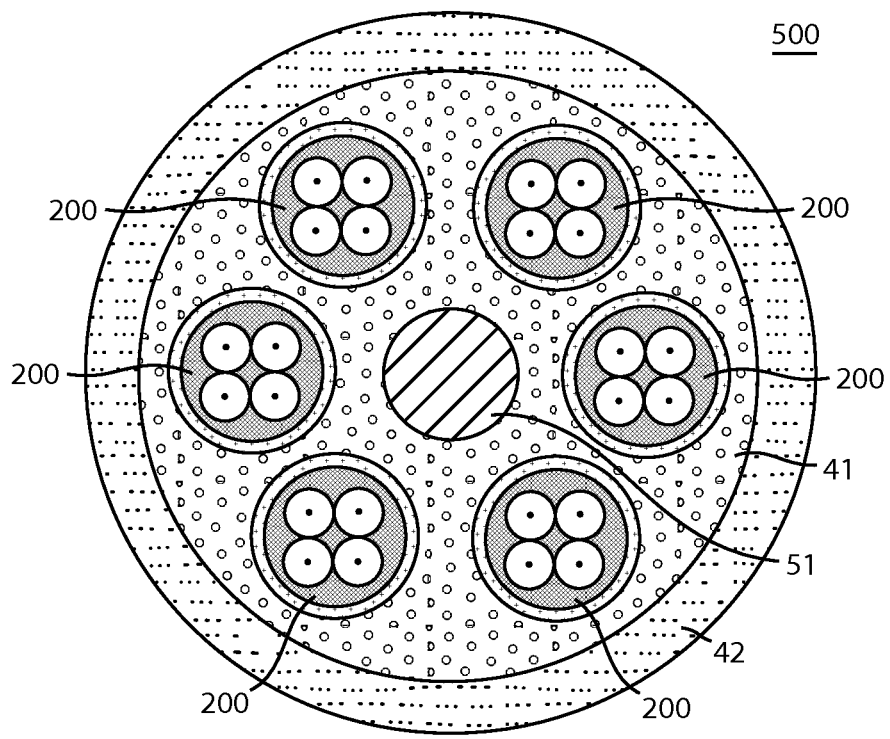
FIG. 5 shows an optical cable that includes a plurality of the CFU of FIG. 2, in accordance with the present invention.

Optical fiber cables with more than one CFU 200 offer an attractive alternative design, one that produces increased fiber count while still relatively small and compact. CFUs of any number, for example two to eight, can be combined in a single jacket 42. For example, efficient packing is obtained in a cable with six CFUs 200, as shown in FIG. 5. This design has a central strength member 51 to aid in organizing the CFUs 200, within the yarn 41 and the jacket 42. Alternatively, the center space may be occupied by another CFU 200 instead of the central strength member 51. As mentioned above, the individual optical fibers may be color coded to aid in identifying and organizing the optical fibers for ribbonizing or splicing. In the embodiment shown in FIG. 5, the jackets 42 may also be color coded to provide additional aid in organizing the optical fibers.

Furthermore, the CFU 200 may be used as an optical fiber package for air-blown installation application. In the air-blown installation application, the outer surface of CFU 200 is usually modified to reduce surface friction and increase aerodynamic. For example, the CFU may be embedded with glass beads in the outermost layer or encapsulated with a unit in a skin of extruded low-friction plastic to reduce surface area that would contact with conduit or gas pipeline during the installation.

The embodiments disclosed herein seek to eliminate substantially all of the voids or air gaps within the closed interior spaces of a CFU by wetting a plurality of optical fibers that comprises the CFU with an acrylate prepolymer resin before the plurality of the optical fibers are grouped together tightly. In one embodiment, instead of applying a first acrylate prepolymer resin to the optical fibers immediately after a first die, the disclosed process wets the optical fibers into a first acrylate prepolymer resin prior to the first die. Stated differently, the first acrylate prepolymer resin wets the optical fibers before the first die groups the optical fibers together. In one preferred embodiment, the first acrylate prepolymer resin that wets the optical fibers prior to the first die and the second acrylate prepolymer resin that is applied immediately after the first die share approximately the same optical and mechanical properties.

By wetting the optical fibers with an acrylate prepolymer resin prior to the creation of any closed interior spaces, there are sufficient amount of the acrylate resin to fill in the voids or air gaps that would be present within the closed interior spaces in a conventional CFU manufacturing process using the pultrusion process. Thus, the disclosed inventive pultrusion process results in more robust CFUs that prevent penetration of liquid or gas inside the CFUs that would cause components and transmission failure and other detrimental effect upon lifetime of the product.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A pultrusion process for making a compact fiber unit (CFU) without a void in a closed interior space, comprising the steps of:
    paying out a plurality of optical fibers;
    wetting the plurality of the optical fibers with a first acrylate prepolymer resin;
    grouping the wetted optical fibers tightly together, whereby the grouping step creates the closed interior space and the closed interior space is filled with the first acrylate prepolymer resin;
    applying a second acrylate prepolymer resin onto the grouped optical fibers; and
    curing the acrylate prepolymer resins to form first and second acrylate resins.

2. The pultrusion process of claim 1, wherein at least one filler is paid out when the plurality of the optical fibers are paid out, and the at least one filler is grouped together with the plurality of the optical fibers before the plurality of the optical fibers are wetted by the first acrylate prepolymer resin.

3. The pultrusion process of claim 1, wherein the viscosity of the first acrylate prepolymer resin is at least 1000 mPas-sec at 25° C.

4. The pultrusion process of claim 1, wherein a die groups the wetted optical fibers tightly together.

5. The pultrusion process of claim 1, wherein the wetted optical fibers are grouped tightly together by twisting the coated optical fibers.

6. The pultrusion process of claim 1, wherein the first acrylate prepolymer resin and second acrylate prepolymer resin are the same resin.

7. The pultrusion process of claim 1, wherein the first acrylate prepolymer resin and second acrylate prepolymer resin are different resin.

8. The pultrusion process of claim 1, further comprising the step of applying a third acrylate prepolymer resin onto the second acrylate prepolymer resin.

9. The pultrusion process of claim 1, further comprising the steps of:
    applying a third acrylate prepolymer resin onto the second acrylate resin; and
    curing the third acrylate prepolymer resin.

10. A compact fiber unit (CFU) manufactured by the process of claim 1.

11. The CFU of claim 10, wherein the first acrylate resin and second acrylate resin are the same resin.

12. The CFU of claim 10, wherein the first acrylate resin and second acrylate resin are different resin.

13. The CFU of claim 10, wherein the CFU further comprises a third acrylate resin that is applied over the second acrylate resin.

14. The CFU of claim 13, wherein the second acrylate resin is softer than the third acrylate resin.

15. The CFU of claim 10, further comprising glass beads embedded in the second acrylate resin.

16. The CFU of claim 10, further comprising a skin of extruded low-friction plastic around the second acrylate resin.

17. An optical fiber cable comprising:
    a compact fiber unit (CFU) manufactured by the process of claim 1;
    a yarn that surrounds the CFU; and
    a jacket that surrounds the yarn.

18. The optical fiber cable of claim 17, wherein the first acrylate resin and second acrylate resin are the same resin.

19. The optical fiber cable of claim 17, wherein the first acrylate resin and second acrylate resin are different resin.

20. The optical fiber cable of claim 17, wherein the CFU further comprises a third acrylate resin applied over the second acrylate resin.

* * * * *